(12) United States Patent
Aller

(10) Patent No.: US 12,391,203 B2
(45) Date of Patent: Aug. 19, 2025

(54) SELECTIVELY REPOSITIONABLE AIRBAG MODULE FOR A VEHICLE

(71) Applicant: GM Global Technology Operations LLC, Detroit, MI (US)

(72) Inventor: David M. Aller, Grosse Pointe Farms, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 200 days.

(21) Appl. No.: 18/315,772

(22) Filed: May 11, 2023

(65) Prior Publication Data

US 2024/0375602 A1 Nov. 14, 2024

(51) Int. Cl.
| | | |
|---|---|---|
| *B60R 21/01* | (2006.01) | |
| *B60R 21/015* | (2006.01) | |
| *B60R 21/20* | (2011.01) | |
| *H01F 7/06* | (2006.01) | |

(52) U.S. Cl.
CPC .. *B60R 21/01512* (2014.10); *B60R 21/01554* (2014.10); *B60R 21/20* (2013.01); *H01F 7/064* (2013.01); *B60R 2021/01211* (2013.01)

(58) Field of Classification Search
CPC .............. B60R 21/20; B60R 21/01512; B60R 21/01554; B60R 2021/01211; B60R 21/207; B60R 21/233; B60R 21/2334; B60R 21/23138; B60R 21/23386; B60R 2021/23146; B60R 2021/0034; B60R 2021/23386; B60R 2022/028; B60R 2022/027; H01F 7/064
USPC .......................................................... 701/45
See application file for complete search history.

(56) References Cited

U.S. PATENT DOCUMENTS

| | | | |
|---|---|---|---|
| 5,146,853 A | 9/1992 | Suppes | |
| 5,588,671 A * | 12/1996 | Boumarafi | ........... B60N 2/5825 |
| | | | 280/730.2 |
| 5,967,549 A | 10/1999 | Allen et al. | |
| 6,726,242 B2 * | 4/2004 | Moon | .................... B60R 21/239 |
| | | | 280/739 |
| 7,224,252 B2 | 5/2007 | Meadow, Jr. et al. | |
| 9,193,324 B2 * | 11/2015 | Osterfeld | ............ B60R 21/2176 |
| 11,267,427 B1 * | 3/2022 | Deng | .................... B60R 21/207 |
| 11,279,309 B2 * | 3/2022 | Kromm | ............... B60R 21/2176 |
| 11,958,390 B2 | 4/2024 | Chen | |
| 2008/0217887 A1 * | 9/2008 | Seymour | ............... B60R 21/201 |
| | | | 280/743.1 |
| 2018/0201211 A1 * | 7/2018 | Gandhi | ................... B60R 21/01 |
| 2020/0217637 A1 | 7/2020 | Del Vecchio et al. | |
| 2022/0324404 A1 * | 10/2022 | Bertossi | ............ B60R 21/23138 |
| 2024/0043229 A1 | 2/2024 | Baker et al. | |

(Continued)

FOREIGN PATENT DOCUMENTS

WO 2024156413 A1 8/2024

*Primary Examiner* — Logan M Kraft
*Assistant Examiner* — Johnny H Hoang
(74) *Attorney, Agent, or Firm* — CANTOR COLBURN LLP

(57) ABSTRACT

A selectively repositionable airbag module for a vehicle includes a housing having enclosable side walls defining an interior zone. The enclosable side walls include a support surface. An airbag is arranged in the interior zone. A connector system is mounted at the support surface. The connector system includes one or more connector elements that extend through the support surface to connect the housing to a vehicle floor.

20 Claims, 3 Drawing Sheets

(56) References Cited

U.S. PATENT DOCUMENTS

2024/0140283 A1    5/2024   Aller
2024/0375602 A1*  11/2024  Aller ........................ B60R 21/20

* cited by examiner

SELECTIVELY REPOSITIONABLE AIRBAG MODULE FOR A VEHICLE

INTRODUCTION

The subject disclosure relates to the art of supplemental restraint systems for vehicles and, more particularly to a selectively repositionable airbag module for a vehicle.

Vehicles include a wide array of supplemental restraint systems or airbags that are deployed in various portions of a passenger compartment. Airbags are arranged in steering wheel hubs, dashboard components, structural components such as "A"-pillars, "B"-pillars, and in other final structures. Airbags are also arranged in various seating components, door components, and the like. The airbags cooperate with seat belts to limit occupant excursions from vehicle seats during sudden and/or unexpected vehicle decelerations.

The airbags are effective at supporting occupants in known seating configurations. However, certain vehicles may include reconfigurable seating configurations. For example, it may be possible to remove rows of seating from vans, sport utility vehicles and the like. When a row is removed, airbag(s) associated with the seating position may be deactivated. Vehicles may allow seating configurations to be modified, including adding new seating arrangements including unique seating positions. Current systems may not provide for airbags that can be added to the vehicle in newly configured seating locations. Accordingly, it is desirable to provide an airbag system that can be mounted anywhere in a vehicle to accommodate a wide array of seating configurations.

SUMMARY

A selectively repositionable airbag module for a vehicle, in accordance with a non-limiting example, includes a housing having enclosable side walls defining an interior zone. The enclosable side walls include a support surface. An airbag is arranged in the interior zone. A connector system is mounted at the support surface. The connector system includes one or more connector elements that extend through the support surface to connect the housing to a vehicle floor.

In addition to one or more of the features described herein the connector system includes a solenoid and a toggle, the solenoid selectively deploying the toggle through the support surface to connect the housing to the vehicle floor.

In addition to one or more of the features described herein a power source is connected with the solenoid and the airbag.

In addition to one or more of the features described herein a magnetic levitation (MAGLEV) system is arranged in the housing and connected with the power source.

In addition to one or more of the features described herein a sensor array is arranged at the housing, the sensor array including a plurality of sensors, the plurality of sensors being configured to determine one or more of a position of the housing in the vehicle, occupancy of a vehicle seat adjacent the housing, location of passenger seats in the vehicle, and a presence of obstacles in the vehicle.

In addition to one or more of the features described herein a controller is operatively connected to the sensor array and MAGLEV system, the controller being operable to actuate the MAGLEV system to move the housing to a selected position in the vehicle based on seat position and seat occupancy.

A vehicle, in accordance with a non-limiting example, includes a passenger compartment including a floor. The floor includes a plurality of connector elements. A seat is arranged in the passenger compartment. The seat is selectively positionable on the floor and connected to the plurality of connector elements. A selectively repositionable airbag module is arranged in the passenger compartment. The selectively repositionable airbag module includes a housing including an outer surface and an inner surface defining an interior zone. The housing includes a support surface. The outer surface includes an opening that exposes the interior zone. An airbag is arranged in the opening. A connector system is mounted at the support surface. The connector system includes one or more connector elements that connect the housing to a vehicle floor.

In addition to one or more of the features described herein the connector system includes a solenoid and a toggle, the solenoid selectively deploying the toggle through the support surface to engage with select ones of the one or more connector elements to secure the housing to the vehicle floor.

In addition to one or more of the features described herein a power source is connected with the solenoid and the airbag.

In addition to one or more of the features described herein a magnetic levitation (MAGLEV) system is arranged in the housing and connected with the power source.

In addition to one or more of the features described herein a sensor array is arranged at the housing, the sensor array including a plurality of sensors, the plurality of sensors being configured to determine one or more of a position of the housing in the vehicle, occupancy of a vehicle seat adjacent the housing, location of passenger seats in the vehicle, and a presence of obstacles in the vehicle.

In addition to one or more of the features described herein a controller operatively connected to the sensor array and MAGLEV system, the controller being operable to actuate the MAGLEV system to move the housing to a selected position in the vehicle based on seat position and seat occupancy.

A method of adjusting an airbag in a vehicle includes detecting a change in seating configuration in a passenger compartment of the vehicle, determining a new location for a selectively repositionable airbag module in the passenger compartment, disconnecting the selectively repositionable airbag module from a floor of the passenger compartment, and moving the selectively repositionable airbag module to the new location.

In addition to one or more of the features described herein disconnecting the selectively repositionable airbag module includes retracting one or more toggles from the floor of the passenger compartment.

In addition to one or more of the features described herein retracting the one or more toggles includes activating a solenoid connected to each of the one or more toggles.

In addition to one or more of the features described herein deploying the one or more toggles through the floor of the passenger compartment at the new location.

In addition to one or more of the features described herein determining the new location includes detecting a seat in a new seat position in the passenger compartment.

In addition to one or more of the features described herein wherein determining the new location includes detecting an occupant in the seat.

In addition to one or more of the features described herein moving the selectively repositionable airbag module includes activating a magnetic levitation (MAGLEV) system in the selectively repositionable airbag module.

In addition to one or more of the features described herein activating the MAGLEV system includes floating the selectively repositionable airbag module to the new location.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
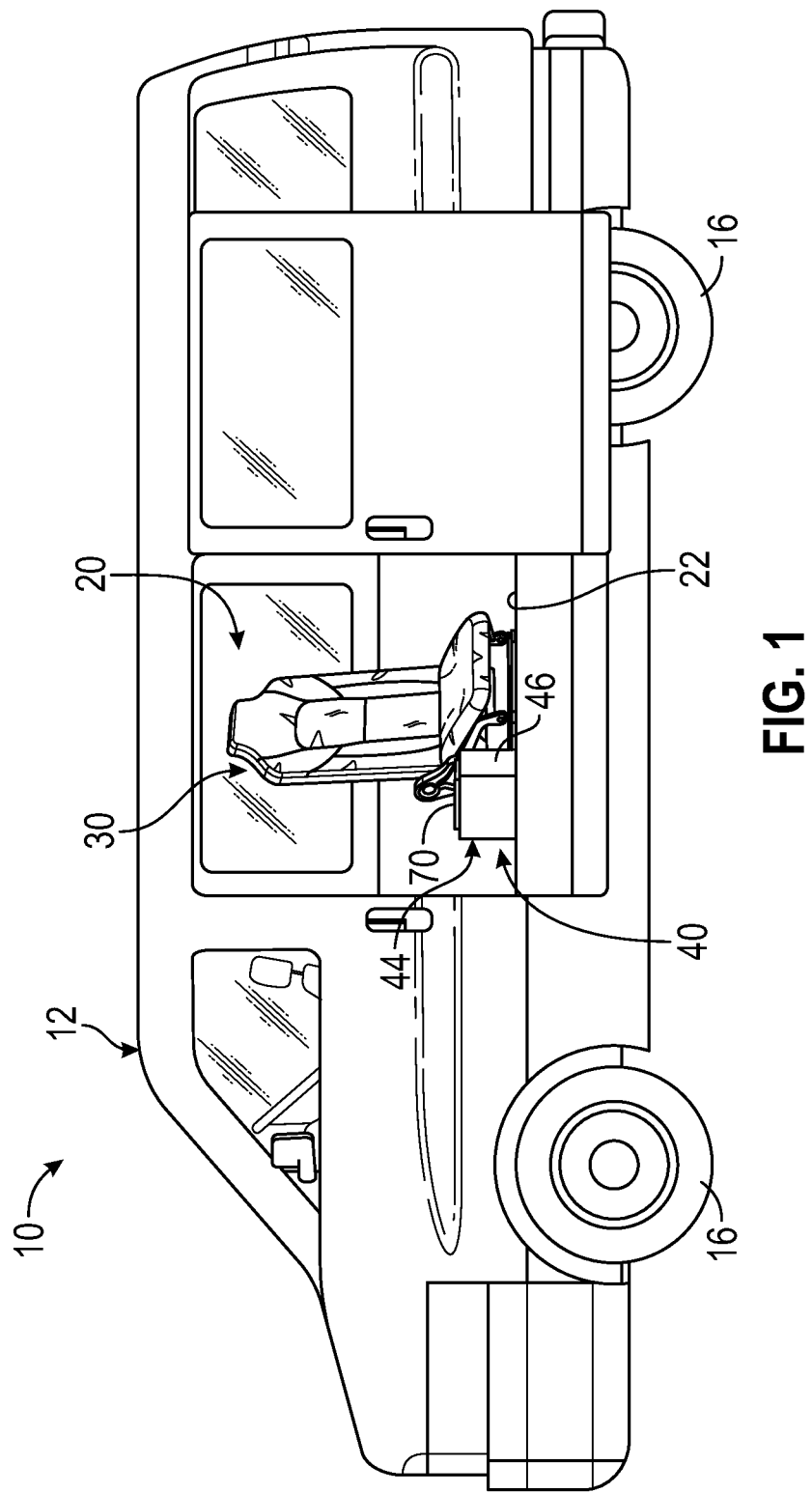
FIG. 1 is a left side view of a vehicle including a selectively repositionable airbag module, in accordance with a non-limiting example.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
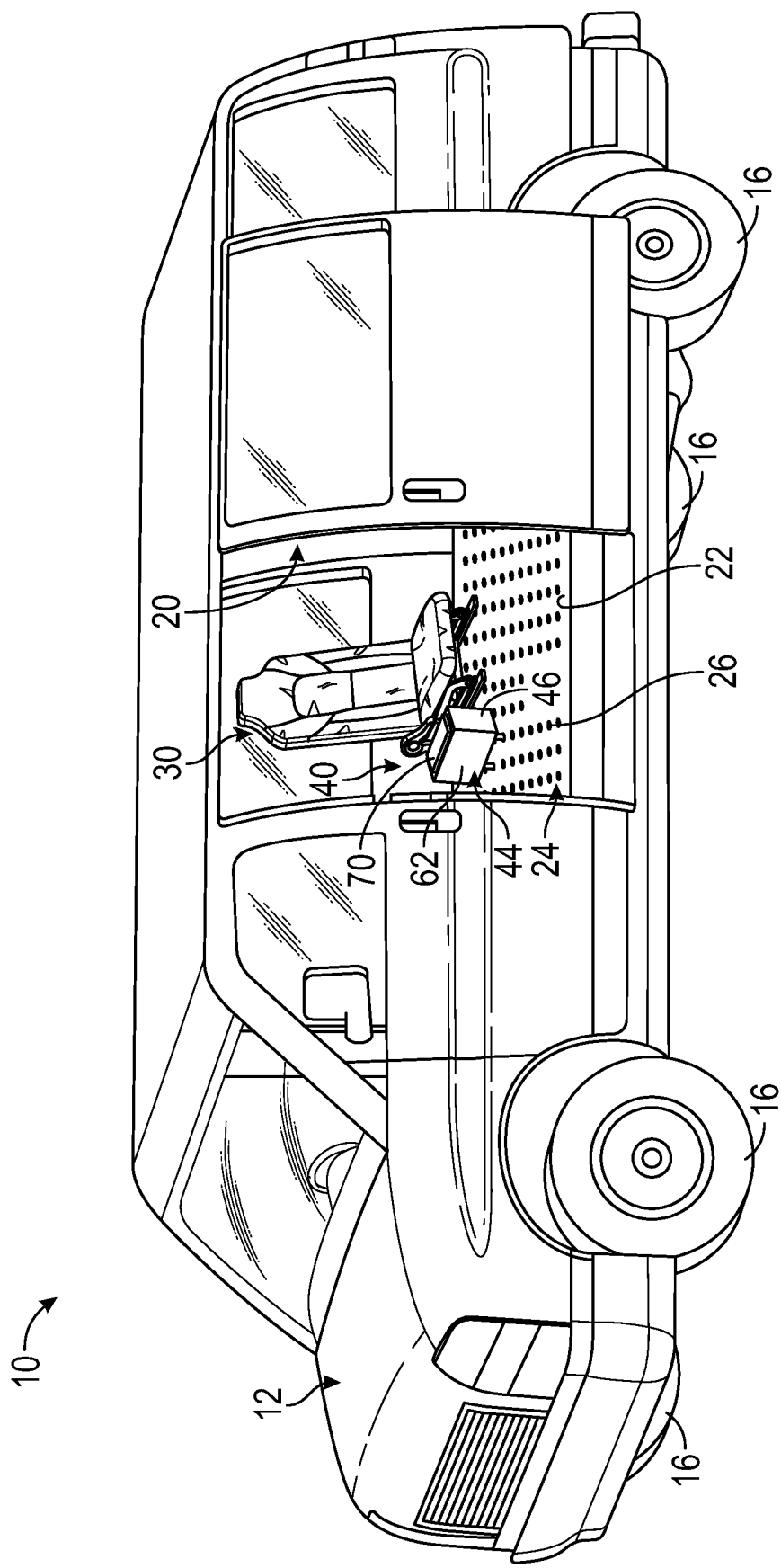
FIG. 2 is a perspective view of an interior of the vehicle of FIG. 1 depicting the a selectively repositionable airbag module adjacent a seat, in accordance with a non-limiting example.

A vehicle, in accordance with a non-limiting example, is indicated at 10 in FIGS. 1 and 2. Vehicle 10 includes a body 12 supported on a plurality of wheels 16. Body 12 defines, in part, a passenger compartment 20 including a floor 22 having a plurality of connector elements 24, FIG. 2. Connector elements 24 are shown in the form of openings 26 formed in floor 22. A plurality of seats, one of which is indicated at 30, is arranged in passenger compartment 20 on floor 22. Seats 30 are selectively repositionable in passenger compartment 20 to create a variety of seating configurations. Seats 30 may include structure that interfaces with connector elements 24 as will be detailed herein.

Vehicle 10 includes a number of fixed supplemental restraint systems or airbags (not shown) arranged in passenger compartment 20. While the coverage provided by the airbags for fixed and/or conventional seating configurations is good, there are potential seating configurations made possible by connector elements 24 that might not be afforded conventional airbag protection. In a non-limiting example, a selectively repositionable airbag module 40 is disposed in passenger compartment 20. As will be detailed herein, selectively repositionable airbag module 40 may be moved, or may move on its own, to a location adjacent a new seating position that may not be covered by existing, fixed airbags.

Figure 3:
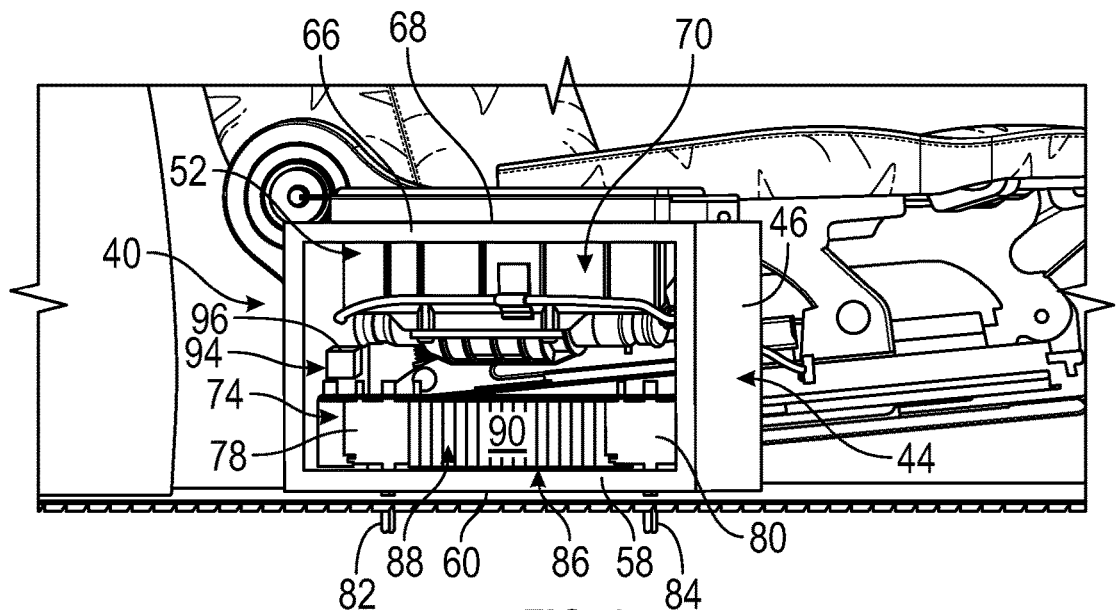
FIG. 3 is a plan view of the a selectively repositionable airbag module adjacent the seat of FIG. 2, in accordance with a non-limiting example.
Figure 4:
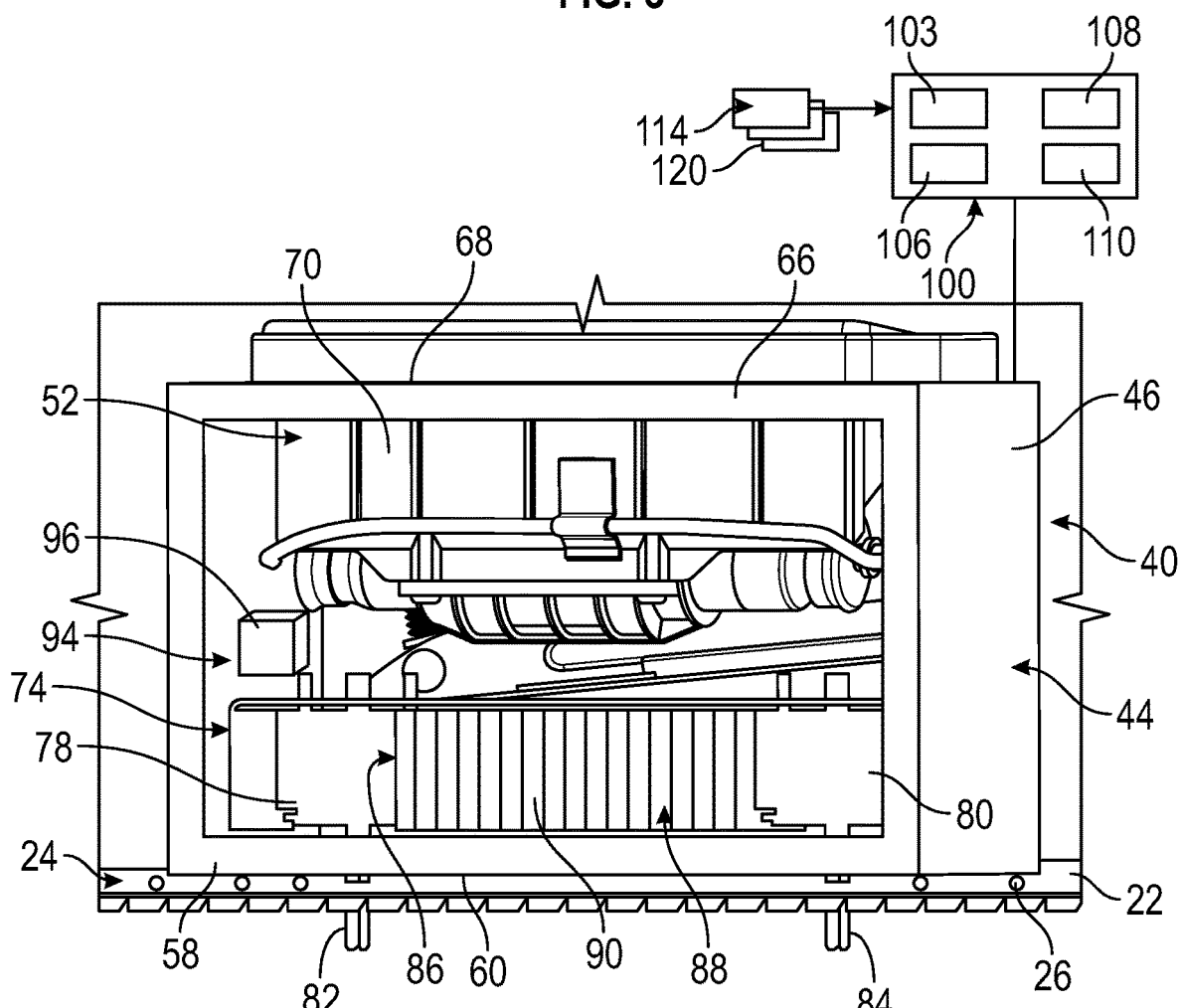
FIG. 4 is a plan view of the a selectively repositionable airbag module of FIG. 3, in accordance with a non-limiting example.

Referring to FIGS. 3 and 4 and with continued reference to FIGS. 1 and 2, selectively repositionable airbag module 40 includes a housing 44 having enclosable sides walls 46 defining an interior zone 52. In a non-limiting example, enclosable side walls 46 include a support wall 58 defining a lower support surface 60 and an upper edge 66 having an opening 68. A supplemental inflatable restraint or airbag 70 is arranged in interior zone 52 and is deployable through opening 68. In a non-limiting example, selectively repositionable airbag module 40 includes a connector system 74 arranged in interior zone 52. Connector system 74 includes a first solenoid 78 and a second solenoid 80 mounted to support wall 58.

First solenoid 78 is connected to a first toggle 82 and second solenoid 80 is connected to second toggle 84. First solenoid 78 and second solenoid 80 selectively deploy first toggle 82 and second toggle 84 through lower support surface 60 into select ones of the plurality of connector elements 24. That is, first solenoid 78 and second solenoid 80 deploy first toggle 82 and second toggle 84 to secure repositionable airbag module 40 to floor 22 at a selected location in passenger compartment 20. First solenoid 78 and second solenoid 80 may also retract first toggle 82 and second toggle 84 to release repositionable airbag module 40, from floor 22.

In accordance with a non-limiting example, repositionable airbag module 40 includes a magnetic levitation (MAGLEV) system 86. MAGLEV system 86 includes a plurality of magnets, indicated generally at 88 mounted at support wall 58. As will be detailed herein, the plurality of magnets 88 take the form of electromagnets 90 that are selectively activated in order to repel repositionable airbag module 40 from floor 22 of passenger compartment 20. Once levitated, repositionable airbag module 40 may move about floor 22 as will be discussed herein.

In a non-limiting example, repositionable airbag module 40 also includes a power source 94 that may take the form of a rechargeable battery 96 arranged in interior zone 52. Rechargeable battery 96 provides power to various components in interior zone 52 including first solenoid 78, second solenoid 80, and MAGLEV system 86 including electromagnets 90. As will be detailed herein, repositionable airbag module 40 may move autonomously, or in response to user commands to a new location on floor 22 to accommodate a new seating position. MAGLEV system 86 may "float" repositionable airbag module 40 from a current position to the new position as will be detailed herein.

In a non-limiting example, a controller 100 is coupled to repositionable airbag module 40. Controller 100 includes a central processor unit (CPU) 103 operatively connected to a non-volatile memory 106, an airbag control module 108 and a MAGLEV control module 110. While shown as being co-located, CPU 103, non-volatile memory 106, airbag control module 108 and MAGLEV control module 110 may be integrated into other systems. Controller 100 is further connected to a sensor array 114 including a plurality of sensors 120 that may detect various parameters in passenger compartment 20 including seat position, occupant location, objects that may interfere with airbag deployment and the like.

In a non-limiting example, when seats are reconfigured in passenger compartment 20, a user may reposition repositionable airbag module 40 to a selected location manually, or repositionable airbag module 40 may autonomously move to a new position. Controller 100, upon sensing or receiving a new seating configuration will signal MAGLEV control module 110 to release first toggle 82 and second toggle 84 to free housing 44 from floor 22 of passenger compartment. Controller 100 may determine a new selected position for repositionable airbag module 40. At this point, MAGLEV control module 110 will "float" repositionable airbag module 40 to the new position without a need for user assistance. When in the new position, controller 100 will redeploy first toggle 82 and second toggle 84 to secure housing 44 to floor 22 of passenger compartment 20.

Controller 100 may rely in sensed input from sensor array 114 to determine whether an occupant is in seat 30 at the new position. That is, if seat 30 is not occupied, controller 100 may decide that a different new location is more appropriate for airbag module 40. In addition, controller 100 may, through sensor array 114, detect an obstacle, such as a suitcase, a stroller, a box, or the like that may impede airbag deployment. If such an obstacle is detected, controller 100 may signal airbag control module 108 to temporarily deactivate airbag 70.

At this point, it should be understood that the non-limiting examples described herein present a system for manually or automatically repositioning an airbag in a passenger compartment of a vehicle. If a seating configuration is changed, and a new seating position(s) is not near a fixed airbag, the repositionable airbag module is relocated to the new seating position.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A selectively repositionable airbag module for a vehicle having a vehicle floor with openings formed therein, the selectively repositionable airbag module comprising:
   a housing including enclosable side walls including defining an interior zone, the enclosable side walls including a support surface;
   an airbag arranged in the interior zone; and
   a connector system mounted at the support surface, the connector system including a solenoid and a toggle,
   wherein the solenoid is configured to deploy the toggle such that the toggle extends into the openings to connect the housing to the vehicle floor, and
   wherein the solenoid is configured to retract the toggle such that the toggle retracts from the openings to disconnect the housing from the vehicle floor.

2. The selectively repositionable airbag module according to claim 1, wherein the solenoid is configured to selectively deploy the toggle through the support surface to connect the housing to the vehicle floor.

3. The selectively repositionable airbag module according to claim 2, further comprising a power source connected with the solenoid and the airbag.

4. The selectively repositionable airbag module according to claim 3, further comprising a magnetic levitation (MAGLEV) system arranged in the housing and connected with the power source.

5. The selectively repositionable airbag module according to claim 4, further comprising a sensor array arranged at the housing, the sensor array including a plurality of sensors, the plurality of sensors being configured to determine one or more of a position of the housing in the vehicle, occupancy of a vehicle seat adjacent the housing, location of passenger seats in the vehicle, and a presence of obstacles in the vehicle.

6. The selectively repositionable airbag module according to claim 5, further comprising a controller operatively connected to the sensor array and MAGLEV system, the controller being operable to actuate the MAGLEV system to move the housing to a selected position in the vehicle based on seat position and seat occupancy.

7. A vehicle comprising:
   a passenger compartment including a vehicle floor, the vehicle floor including a plurality of openings;
   a plurality of seats arranged in the passenger compartment, at least one of the plurality of seats being selectively positionable on the vehicle floor and connected to the plurality of openings; and
   a selectively repositionable airbag module arranged in the passenger compartment, the selectively repositionable airbag module comprising:
   a housing having enclosable side walls defining an interior zone, the enclosable side walls include a support surface;
   an airbag is arranged in the interior zone; and
   a connector system mounted at the support surface, the connector system including a solenoid and a toggle,
   wherein the solenoid is configured to deploy the toggle such that the toggle extends into the openings to connect the housing to the vehicle floor, and
   wherein the solenoid is configured to retract the toggle such that the toggle retracts from the openings to disconnect the housing from the vehicle floor.

8. The vehicle according to claim 7, wherein the solenoid is configured to selectively deploy the toggle through the support surface to engage with select ones of the one or more connector elements to secure the housing to the vehicle floor.

9. The vehicle according to claim 8, further comprising a power source connected with the solenoid and the airbag.

10. The vehicle according to claim 9, further comprising a magnetic levitation (MAGLEV) system arranged in the housing and connected with the power source.

11. The vehicle according to claim 10, further comprising a sensor array arranged at the housing, the sensor array including a plurality of sensors, the plurality of sensors being configured to determine one or more of a position of the housing in the vehicle, occupancy of a vehicle seat adjacent the housing, location of passenger seats in the vehicle, and a presence of obstacles in the vehicle.

12. The vehicle according to claim 11, further comprising a controller operatively connected to the sensor array and MAGLEV system, the controller being operable to actuate the MAGLEV system to move the housing to a selected position in the vehicle based on seat position and seat occupancy.

13. A method of adjusting an airbag in a vehicle using selectively repositionable airbag module having a connector system,
    wherein the connector system includes a solenoid and a toggle,
    wherein the solenoid is configured to deploy the toggle such that the toggle extends into the openings to connect the housing to a vehicle floor,
    wherein the solenoid is configured to retract the toggle such that the toggle retracts from the openings to disconnect the housing from the vehicle floor, and
    wherein the method comprises:
    detecting a change in seating configuration in a passenger compartment of the vehicle;
    determining a new location for the selectively repositionable airbag module in the passenger compartment;
    disconnecting the selectively repositionable airbag module from the vehicle floor of the passenger compartment; and
    moving the selectively repositionable airbag module to the new location.

14. The method of claim 13, wherein disconnecting the selectively repositionable airbag module includes retracting the toggle from the vehicle floor of the passenger compartment.

15. The method of claim 14, wherein retracting the one or more toggles includes operating the solenoid to retract the toggle from the vehicle floor of the passenger compartment.

16. The method of claim 15, further comprising deploying the toggle through the floor of the passenger compartment at the new location.

17. The method of claim 13, wherein determining the new location includes detecting a seat in a new seat position in the passenger compartment.

18. The method of claim 17, wherein determining the new location includes detecting an occupant in the seat.

19. The method of claim 13, wherein moving the selectively repositionable airbag module includes activating a magnetic levitation (MAGLEV) system in the selectively repositionable airbag module.

20. The method of claim 19, wherein activating the MAGLEV system includes floating the selectively repositionable airbag module to the new location.

* * * * *